US007801021B1

(12) United States Patent
Triantafillis et al.

(10) Patent No.: US 7,801,021 B1
(45) Date of Patent: Sep. 21, 2010

(54) GENERIC ROUTING ENCAPSULATION TUNNEL KEEPALIVES

(75) Inventors: Nikolaos Triantafillis, London (GB); Robert J. Ordemann, High Wycombe (GB); Simon D. Barber, Bishops Castle (GB)

(73) Assignee: Cisco Technology, Inc., San Jose, CA (US)

(*) Notice: Subject to any disclaimer, the term of this patent is extended or adjusted under 35 U.S.C. 154(b) by 2054 days.

(21) Appl. No.: 10/187,202

(22) Filed: Jul. 1, 2002

(51) Int. Cl.
  *G01R 31/08* (2006.01)
  *H04L 12/28* (2006.01)
  *G06F 11/00* (2006.01)
(52) U.S. Cl. ............................. 370/216; 370/409; 714/1
(58) Field of Classification Search ......... 370/216–218, 370/242, 245, 409, 410, 465, 466, 474, 248, 370/249, 401, 252, 253; 714/1–4
  See application file for complete search history.

(56) References Cited

U.S. PATENT DOCUMENTS

| | | | | |
|---|---|---|---|---|
| 5,084,816 A | * | 1/1992 | Boese et al. ................... 714/4 |
| 5,142,531 A | * | 8/1992 | Kirby .......................... 370/254 |
| 5,265,092 A | * | 11/1993 | Soloway et al. .............. 370/238 |
| 5,539,734 A | * | 7/1996 | Burwell et al. ............... 370/410 |
| 5,604,868 A | * | 2/1997 | Komine et al. ............... 709/238 |
| 5,634,097 A | * | 5/1997 | Ashi et al. .................... 714/45 |
| 5,848,227 A | * | 12/1998 | Sheu ............................. 714/4 |
| 5,883,893 A | | 3/1999 | Rumer et al. |
| 5,896,496 A | * | 4/1999 | Suzuki .......................... 714/48 |
| 6,067,286 A | * | 5/2000 | Jones et al. ................... 370/218 |
| 6,278,708 B1 | | 8/2001 | Von Hammerstein et al. |
| 6,286,052 B1 | | 9/2001 | McCloghrie et al. |
| 6,292,495 B1 | | 9/2001 | Von Hammerstein et al. |
| 6,304,546 B1 | | 10/2001 | Natarajan et al. |
| 6,304,576 B1 | | 10/2001 | Corley et al. |
| 6,339,595 B1 | | 1/2002 | Rekhter et al. |
| 6,668,282 B1 | * | 12/2003 | Booth et al. .................. 709/224 |
| 6,816,462 B1 | * | 11/2004 | Booth et al. .................. 370/248 |
| 6,862,288 B2 | * | 3/2005 | Sharma et al. ............... 370/403 |
| 7,230,913 B1 | * | 6/2007 | Vasseur et al. ............... 370/216 |

(Continued)

OTHER PUBLICATIONS

"Generic Routing Encapsulation (GRE)", Request for Comments 1701, Network Working Group, Internet Engineering Task Force (IETF), http://www.ietf.org, Oct. 1994.

(Continued)

*Primary Examiner*—Aung S Moe
*Assistant Examiner*—Kerri M Rose
(74) *Attorney, Agent, or Firm*—Cesari and McKenna, LLP

(57) ABSTRACT

A technique that enables a source endpoint of a tunnel employing encapsulation to determine if a destination endpoint of the tunnel is reachable or unreachable. The technique issues "keepalive" packets that are returned to the source endpoint by a reachable destination endpoint. The source endpoint of the tunnel constructs a keepalive packet containing a return-keepalive packet, encapsulates it and forwards it over the tunnel to the destination endpoint. The destination endpoint, in turn, decapsulates the packet to yield the return-keepalive packet and forwards the return-keepalive packet preferably over the tunnel towards the source endpoint. Upon arrival at the source endpoint, the return-keepalive packet is processed. By receiving the return-keepalive packets the source end-point concludes the destination endpoint is reachable. After a predetermined number of return-keepalive packets have not been received, the source endpoint concludes that the destination endpoint is unreachable.

14 Claims, 10 Drawing Sheets

U.S. PATENT DOCUMENTS

2002/0150039 A1* 10/2002 Valdevit ..................... 370/216
2005/0068933 A1* 3/2005 Kokkonen et al. .......... 370/349
2006/0203717 A1* 9/2006 Puppa et al. ................ 370/216

OTHER PUBLICATIONS

"IP Encapsulation Within IP", Request for Comments 2003, Network Working Group, Internet Engineering Task Force (IETF), http://ietf.org, Oct. 1996.

"What is a VPN?", P. Ferguson, et al., Apr. 1998.

"Generic Routing Encapsulation (GRE)", Request for Comments 2784, Network Working Group, Internet Engineering Task Force (IETF), http://www.ietf.org, Mar. 2000.

"Key and Sequence Number Extensions to GRE", Request for Comments 2890, Network Working Group, Internet Engineering Task Force (IETF), http://www.ietf.org, Sep. 2000.

"What is GRE?", J. Harris Jr., SANS Institute, http://rr.sans.org/securitybasics/GRE.php, May 2001.

* cited by examiner

GENERIC ROUTING ENCAPSULATION TUNNEL KEEPALIVES

BACKGROUND OF THE INVENTION

1. Field of the Invention

This invention relates generally to data communications and more specifically to a technique for determining if a tunnel destination endpoint is reachable.

2. Background Information

A computer network is a geographically distributed collection of interconnected communication links for transporting data between nodes, such as computers. Many types of computer networks are available, with the types ranging from local area networks (LANs) to wide area networks (WANs). The nodes typically communicate by exchanging discrete frames or packets of data according to pre-defined protocols, such as the Transmission Control Protocol/Internet Protocol (TCP/IP) or the Internetwork Packet eXchange (IPX) protocol.

The topology of a computer network can vary greatly. For example, the topology may comprise a single LAN containing a single intermediate node of a type such as, e.g., a hub, with end-nodes attached to the hub, or a more complex network containing one or more local area networks connected together through a complex intermediate internetwork comprising a plurality of other types of intermediate nodes, such as switches or routers, interconnected to form a WAN. Each of these latter intermediate nodes typically comprises a central processor that enables the intermediate node to, inter alia, route or switch the packets of data along the interconnected links from, e.g., a source end-node that originates the data to a destination end-node that is designated to receive the data.

In certain complex networks, the protocol employed by the source and destination end-nodes may be incompatible with the protocol used by the intermediate nodes. For example, a network may be configured such that the source and destination end-nodes communicate using the IPX protocol, whereas, the intermediate nodes exchange data using the IP protocol. Often in such networks, data packets are transferred from a source end-node through the intermediate internetwork to a destination end-node using a technique called "tunneling."

Broadly stated, a tunnel is a logical path through which encapsulated packets travel from a source endpoint through an internetwork to a destination endpoint. Encapsulation is typically performed at the source endpoint of the tunnel and decapsulation is performed at the destination endpoint. Thus, in a typical tunneling implementation, data packets are encapsulated at the source endpoint, sent through the internetwork infrastructure over the tunnel and decapsulated when they reach the destination endpoint.

Encapsulation typically involves enclosing the data (payload) in an additional header to form an encapsulated packet. The additional header, sometimes called a delivery header, provides routing information that enables the encapsulated packet to traverse the intermediate internetwork. Decapsulation typically involves removing the delivery header of the encapsulated packet, thereby yielding the payload. The term tunneling, in general, is often used when referring to the entire process of encapsulation, transmission and decapsulation of packets.

A protocol that may be used in a tunneling implementation to encapsulate packets is the "Generic Routing Encapsulation" (GRE) protocol defined in Request For Comments (RFC) 1701, RFC 2784 and RFC 2890, which RFCs are available from the Internet Engineering Task Force, Network Working Group, http://www.ietf.org and are hereby incorporated by reference as though fully set forth herein. The GRE protocol enables transmission of an arbitrary network protocol over any other second arbitrary network protocol by encapsulating packets of the first protocol within GRE packets that, in turn, are contained within packets of the second protocol. The GRE protocol is typically executed by intermediate nodes, such as routers or switches, that form the source and destination endpoints of a tunnel.

For example, assume a "payload" packet generated by a source end-node requires encapsulation for delivery through an intermediate network to a destination end-node. At the source endpoint of the tunnel, the payload packet is first encapsulated in a GRE packet comprising the payload packet and a GRE header. The resulting GRE packet is then encapsulated in some other protocol, called a "delivery protocol," and forwarded to the destination endpoint of the tunnel. This delivery protocol is the protocol used by intermediate nodes of the network to route or switch the encapsulated packet through the intermediate network from the source to the destination endpoints.

One problem associated with the GRE protocol is that it does not provide a mechanism to determine if the destination endpoint of the tunnel is reachable. By not "knowing" if the destination endpoint is reachable, the source endpoint cannot prevent the loss of traffic should the destination endpoint become unreachable due to various conditions such as, e.g., a misconfiguration of the tunnel or the unavailability of destination endpoint. Also, traffic cannot be routed along alternative paths because the source endpoint considers the tunnel operational, i.e., in an "up" state, and thus continues to route the packet traffic to the tunnel even though the traffic is not received at the destination endpoint. Therefore, it would be desirable to provide a mechanism that enables a source endpoint of tunnel to determine if the tunnel's destination endpoint is reachable.

SUMMARY OF THE INVENTION

The present invention comprises a technique that enables a source endpoint of a tunnel extending through a computer network to determine if a destination endpoint of that tunnel is reachable. To that end, the novel inventive technique uses a novel packet that enables the source endpoint to determine if the destination endpoint associated with the tunnel is reachable.

Specifically, the source endpoint of the tunnel constructs a packet comprising an inner encapsulated packet and an outer encapsulated packet and forwards it towards the destination endpoint. The destination endpoint, in response, decapsulates the inner encapsulated packet and forwards it towards the source endpoint. Upon arrival at the source endpoint, the inner encapsulated packet is decapsulated and processed. According to the invention, if the destination endpoint is unreachable, the source endpoint does not receive the inner encapsulated packet and concludes that the destination endpoint is unreachable. The source endpoint then handles this situation accordingly by, e.g., setting the tunnel to a non-operational ("down") state.

The destination endpoint is not required to run the inventive protocol as described herein. Rather, the forwarding of the packet at the destination endpoint can be transparent to the destination endpoint in that processing and forwarding of the packet may be performed in a manner as any other packet received over the tunnel by the destination endpoint.

Advantageously, the inventive technique utilizes existing standard protocols to determine if a destination endpoint of a tunnel is reachable, thereby obviating the need for a new or proprietary protocol. Moreover, the inventive technique does not rely on mechanisms such as, Internet Control Message Protocol (ICMP) messages or the Packet to INternet Groper (PING) facility, that are typically blocked by specially-configured intermediate node routers and "firewalls." Thus the inventive technique may be employed to operate across such routers and firewalls that would typically block messages generated by these other mechanisms.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 1:
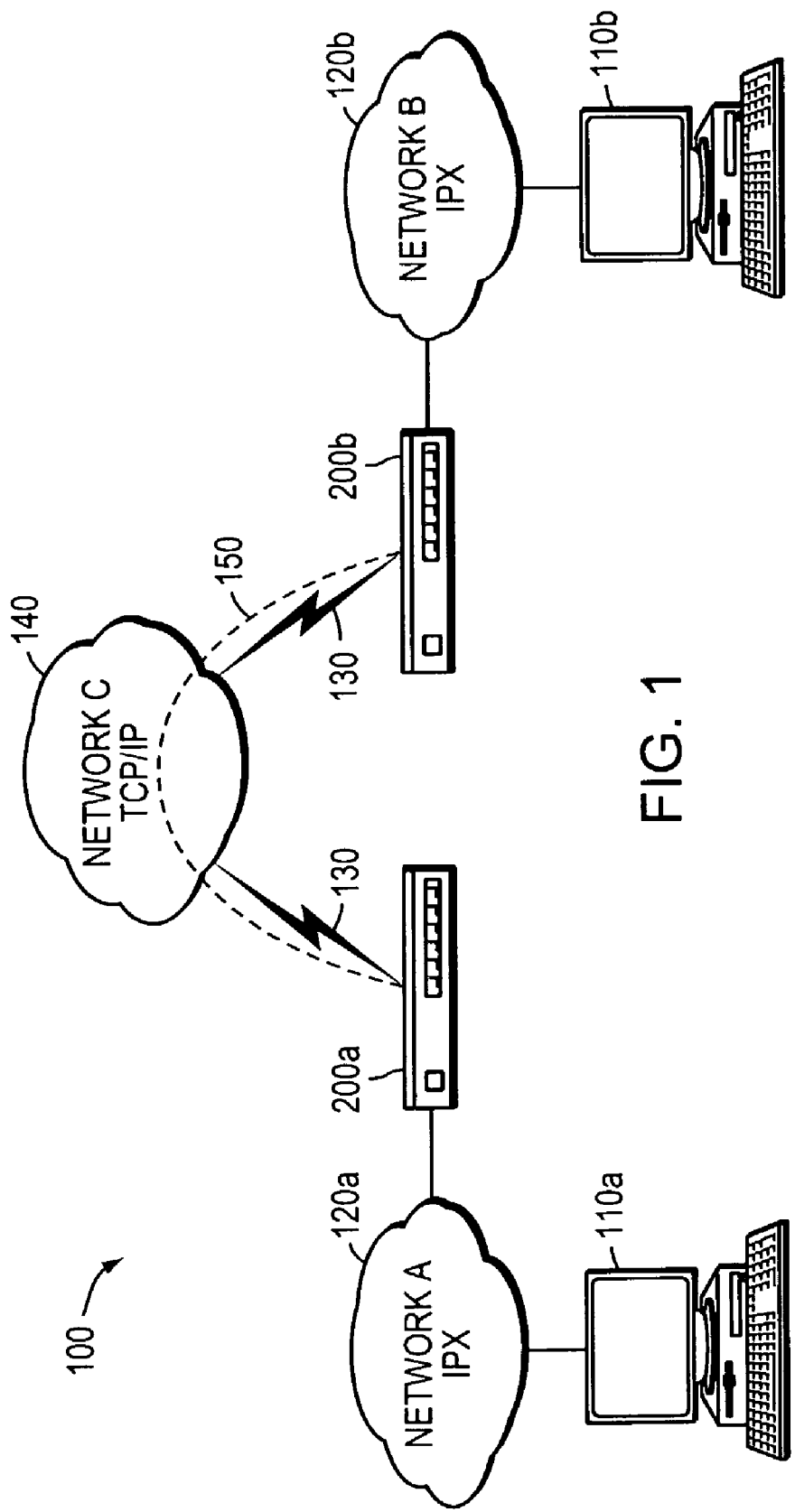
FIG. 1 is a schematic block diagram of a network that can be advantageously used with the present invention.

FIG. 1 is a schematic block diagram of a computer network 100 that can be advantageously used with the present invention. The computer network 100 comprises a collection of communication links and segments connected to a plurality of nodes, such as end nodes 110 and intermediate nodes 200. The network links and segments may comprise local area networks (LANs) 120, wide area networks (WANs) 140 and WAN links 130 interconnected by intermediate nodes 200, such as network switches or routers, to form an internetwork of computer nodes. These internetworked nodes communicate by exchanging data packets according to a predefined set of protocols, such as the Transmission Control Protocol/Internet Protocol (TCP/IP) and the Internetwork Packet eXchange (IPX) protocol.

Figure 2:
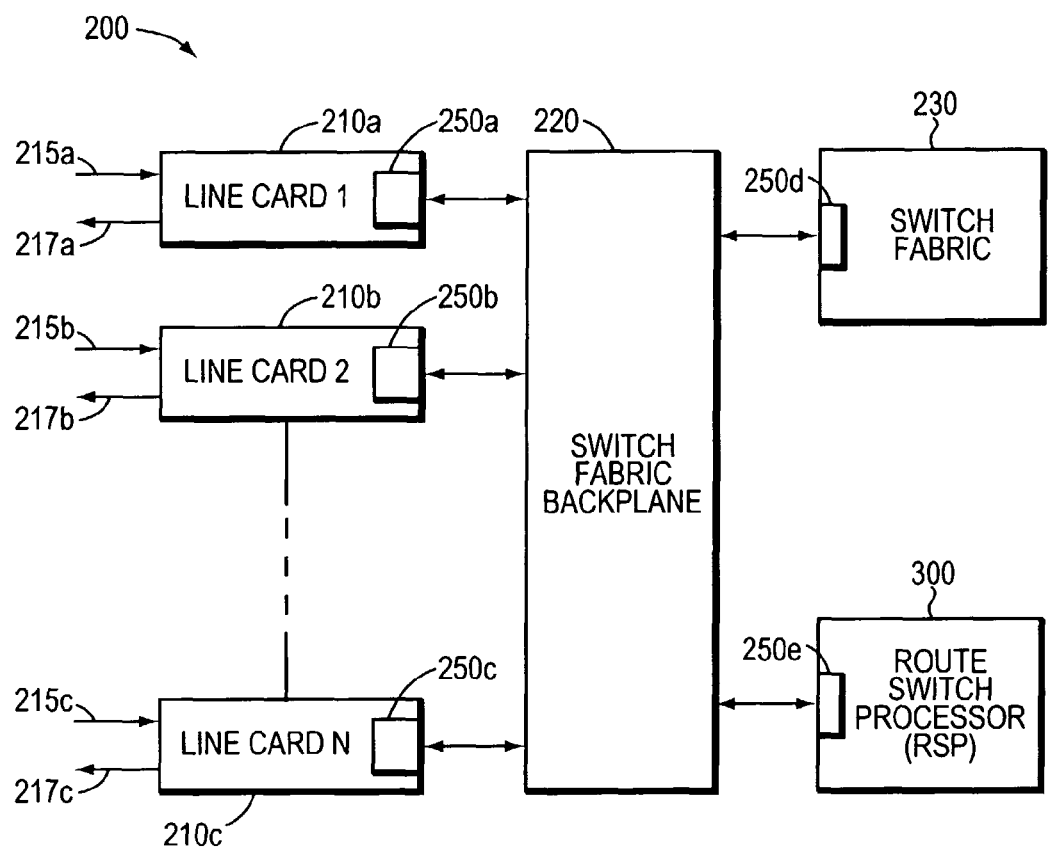
FIG. 2 is a partial schematic block diagram of an intermediate node that can be advantageously used with the present invention.

FIG. 2 is a partial block diagram of an intermediate node 200 that can be advantageously used with the present invention. An illustrative example of intermediate node 200 is the Cisco 7513 Router available from Cisco Systems, Incorporated, San Jose, Califormia. The illustrative intermediate node 200 is a high-end router that supports various combinations of communication protocols including, e.g., Asynchronous Transmission Mode (ATM), Ethernet, Fast Ethernet, Gigabit Ethernet and multi-channel T3. Notably, the intermediate node 200 is designed to support various networking services including tunneling and, to that extent, is adapted to function, inter alia, as a source endpoint of a tunnel, as described further herein. The intermediate node 200 comprises a plurality of cards including line cards 210, a switch fabric card 230 and a route switch processor (RSP) card 300 interconnected by a switch fabric backplane 220. Moreover, each card has a switch fabric interface 250 that, inter alia, interfaces the card to the switch fabric backplane 220 and enables the card to send and receive various data and control signals to and from the switch fabric backplane 220.

The line cards 210 connect (interface) the intermediate node 200, which may alternatively be configured as a switch, with the network 100. To that end, the line cards 210 receive and transmit data over the network through the input 215 and output ports 217, respectively, using various protocols such as, e.g., OC-3, OC-12, Fast Ethernet, T3. The line cards 210 forward data received from the network 100 to the switch fabric backplane 220, as well as transmit data received from the backplane 220 to the network 100.

The switch fabric backplane 220 comprises logic and a point-to-point interconnection backplane that provides an interface between the line cards 210, the switch fabric card 230 and the RSP 300. That is, the switch fabric backplane 220 provides interconnections between the cards that allow data and signals to be transferred from one card to another.

The switch fabric card 230 comprises switch fabric logic (switch fabric) that is configured to switch data between the cards coupled to the switch fabric backplane 220. For example, assume a packet arrives on source line card 210a and the switch fabric card 230 is configured to forward the packet to destination line card 210b. The packet is sent from line card 210a through interface 250a across the switch fabric backplane 220 to interface 250d on the switch fabric card 230. The switch fabric card 230 applies the packet to the switch fabric logic, selects interface 250b on line card 210b and sends the data out interface 250d across the switch fabric backplane 220 to the selected interface 250b.

Figure 3:
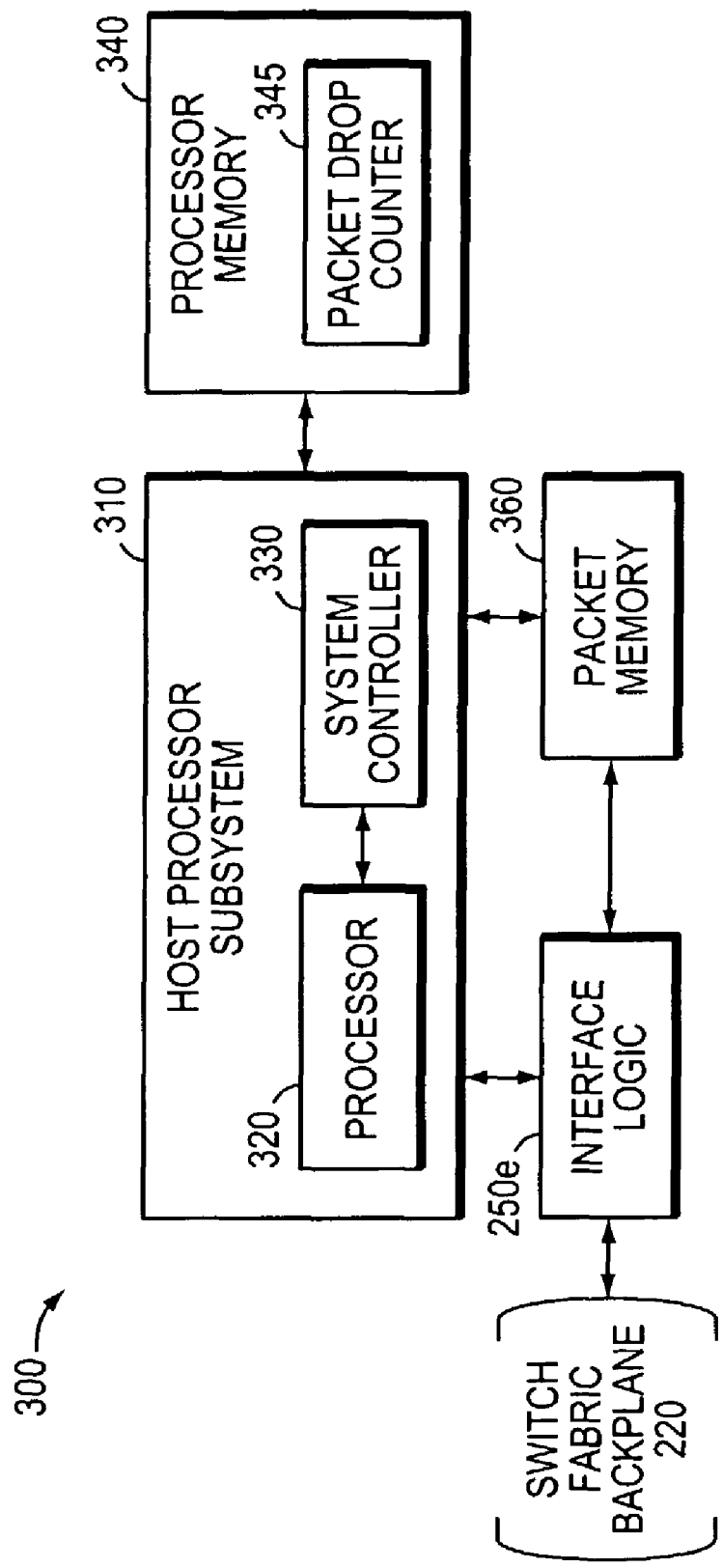
FIG. 3 is a partial schematic block diagram of a route processor module that can be used to implement the present invention.

The RSP 300 is adapted to provide processing for incoming and outgoing packets. FIG. 3 is a partial block diagram of the RSP 300 comprising a host processor subsystem 310, interconnecting processor memory 340, interface logic 250e and packet memory 360. The host processor 310 comprises a processor 320 coupled to a system controller 330. The processor 320, in turn, comprises processing elements and logic that are capable of executing instructions and generating memory requests. An example of processor 320 that may be advantageously used with the invention is the R7000 processor available from MIPS Technologies, Incorporated, Mountain View, Calif. The system controller 330 is preferably embodied in a high performance Application Specific Integrated Circuit (ASIC) configured to interface the processor 320 with the processor memory 340 and the packet memory 360.

The processor memory 340 is a computer readable medium that holds data and software routines containing executable instructions. These data and software routines enable (adapt) the processor 320 to perform various functions, such as routing packets and performing the methods of the present invention. The processor memory 340 may comprise one or more memory devices (not shown) that are capable of storing executable instructions and data. Preferably, these memory devices are industry standard memory devices such as, Dynamic Random Access Memory (DRAM) devices available from Micron Technology, Inc., Boise, Id.

The interface logic 250e comprises hardware logic that, inter alia, provides an interface between the switch fabric backplane 220 (FIG. 2), the packet memory 360 and the host processor 310. The primary function of the interface logic 250e is to interface the packet memory 360 and host processor 310 to the backplane 220. To that end, the interface logic 250e generates the necessary data and control signals that enable data to be transferred between the backplane 220 and the packet memory 360 and host processor 310.

The packet memory 360 comprises memory devices (not shown) capable of storing packets received by the interface logic 250e. Preferably, these memory devices are industry standard high-speed memory storage devices, such as Synchronous Dynamic Random Access Memory (SDRAM) available from Micron Technology, Inc., Boise, Id.

Operationally, incoming packets are received from the network 100 by the source line cards 210 and sent over the switch fabric backplane 220 to the switching fabric 230 for further processing. The switching fabric 230 examines header information contained in the packets and forwards the packets to the appropriate card coupled to the switch fabric backplane 220. Packets destined for the RSP 300 are received by the interface logic 250e and placed in the packet memory 360. The interface logic 250e informs the host processor 310 of the arrival of a packet. The processor 320 processes the packet in part by issuing requests to the system controller 330 to access the packet data stored in the packet memory 360. Further processing, including encapsulation and decapsulation of packets and performing the methods of the present invention as described herein, is performed by executing instructions and manipulating data stored in the processor memory 340. Outgoing packets are then forwarded to destination line cards 210 and sent over the network 100.

The present invention comprises a technique that enables a source endpoint of a tunnel extending through a computer network to determine if a destination endpoint of the tunnel is reachable. To that end, the novel inventive technique issues novel "keepalive" packets that are returned to the source endpoint by a reachable destination endpoint. Specifically in the illustrated embodiment, at regular time intervals, the source endpoint of the tunnel constructs a keepalive packet containing an inner encapsulated packet, e.g., a return-keepalive packet, encapsulates the inner encapsulated packet as an outer encapsulated packet and forwards it over the tunnel to the destination endpoint. The destination endpoint, in response, decapsulates the outer keepalive packet yielding the return-keepalive packet and forwards the latter packet back preferably over the tunnel towards the source endpoint. Upon arrival at the source endpoint, the return-keepalive packet is processed. If the destination endpoint is unreachable, the source endpoint does not receive the return-keepalive packets and, after some number of packets have not been received, concludes that the destination endpoint is unreachable.

Figure 4:
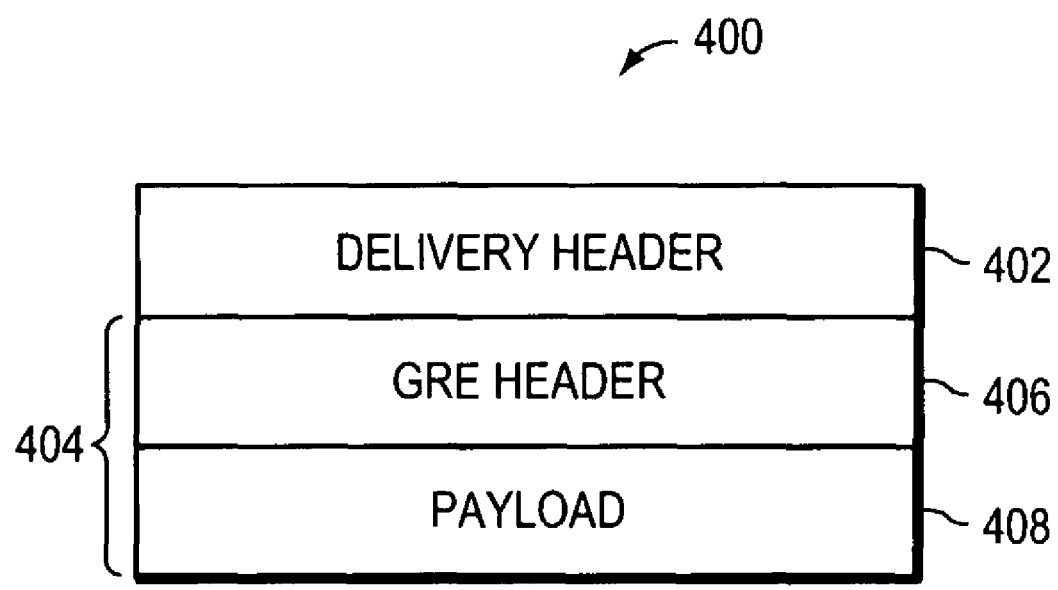
FIG. 4 is an illustration of an encapsulated packet in accordance with the GRE protocol.

Assume a tunnel 150 (FIG. 1) is defined and established between a source endpoint at router 200a and a destination endpoint at router 200b through WAN 140, and that routers 200a and 200b are configured to encapsulate packets sent through the tunnel 150 using, e.g., the GRE protocol. FIG. 4 illustrates a typical packet 400 encapsulated in accordance with the GRE protocol. The packet 400 comprises a delivery header portion 402 and a GRE packet portion 404 that further comprises a GRE header 406 and a payload 408. The delivery header 402 holds protocol information specific to a delivery protocol. For example, if the IP protocol is used as the delivery protocol to deliver the encapsulated packet, the delivery header contains IP header information, such as source address, destination address and so on. The GRE header 406 holds GRE protocol specific information. The payload 408 contains the packet (data) that is encapsulated.

Figure 5:
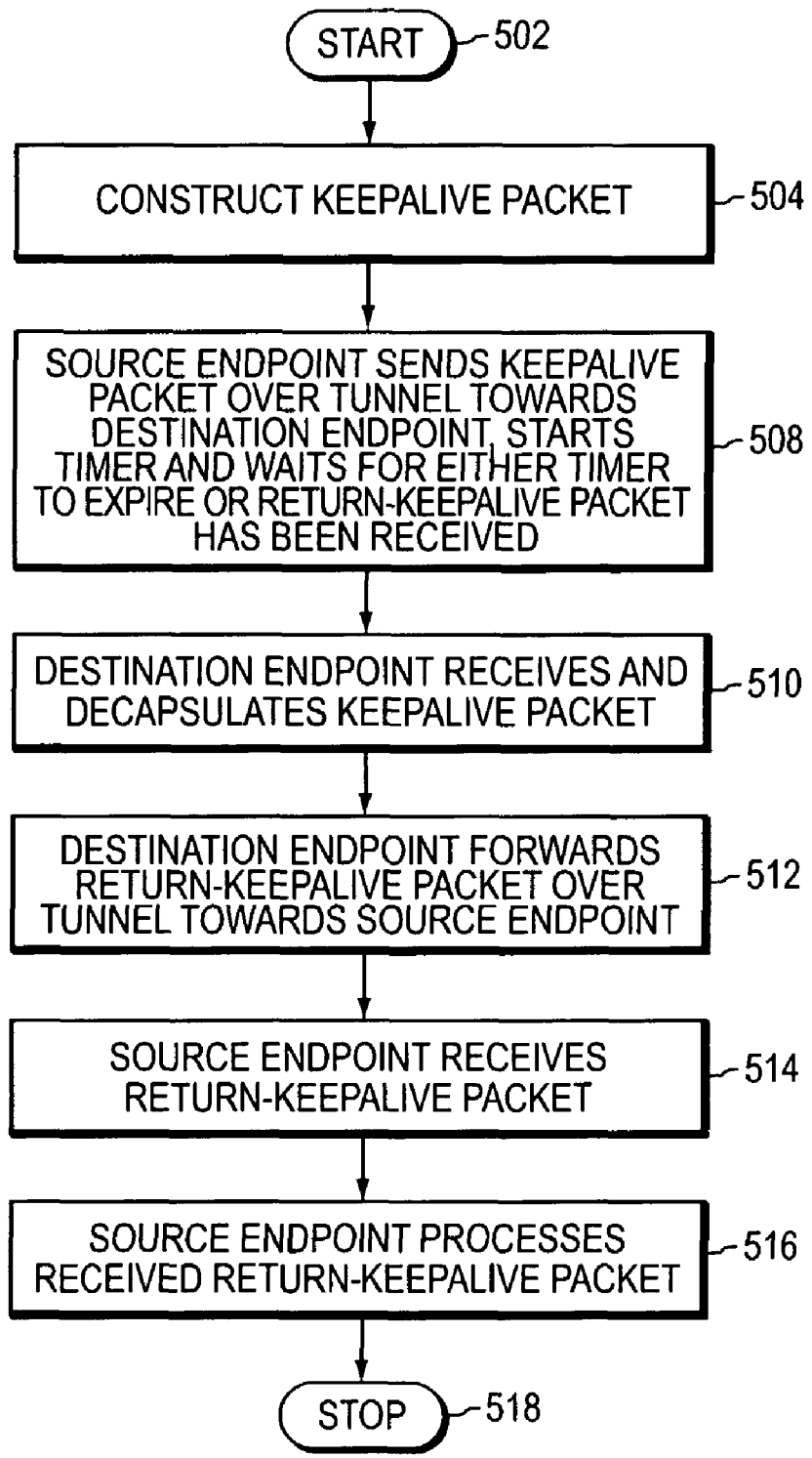
FIG. 5 is a high-level flow diagram of a novel technique that can be used to determine if a destination endpoint is reachable in accordance with the present invention.

Now assume that the source endpoint 200a wishes to be notified if the destination endpoint 200b is reachable. FIG. 5 is a high-level flow diagram of a sequence of steps involved with the novel technique of the present invention that enables a source endpoint, such as router 200a, of tunnel 150 to determine if a destination endpoint, such as router 200b, is reachable. At Step 502 the sequence begins and proceeds to Step 504 where the source endpoint 200a constructs an encapsulated keepalive packet.

Figure 6:
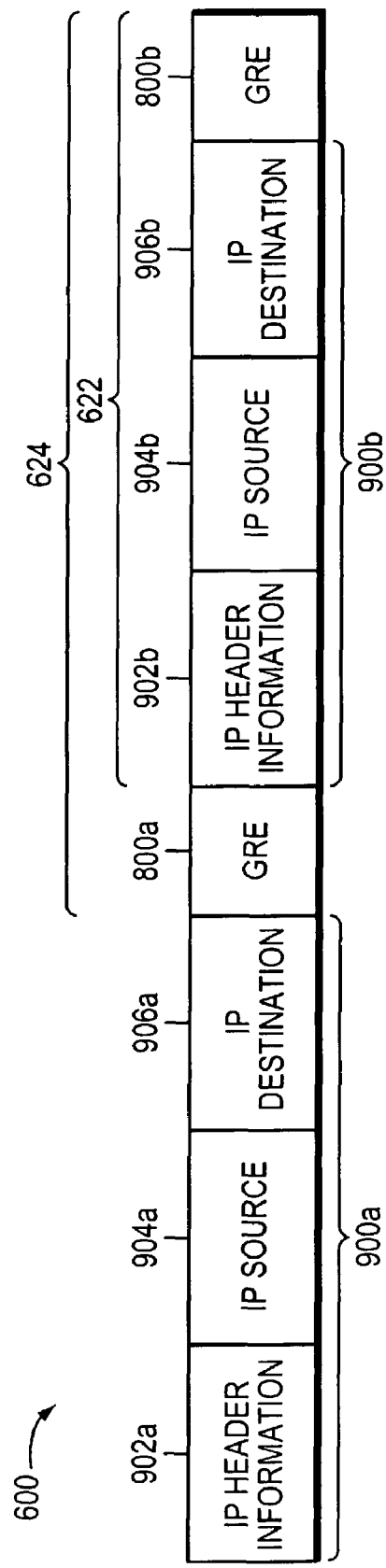
FIG. 6 is an illustration of a keepalive packet in accordance with the present invention.

FIG. 6 illustrates a typical keepalive packet 600 that is encapsulated in accordance with the GRE protocol and that may be advantageously used with present invention. Packet 600 is an outer encapsulated packet that comprises an outer delivery header 900a and an outer GRE packet 624. The outer delivery header 900a is used to deliver the encapsulated keepalive packet 600 through the tunnel to the destination endpoint and comprises IP header information 902a, IP source address 904a and IP destination address 906a related to the delivery protocol used to deliver the packet 600 to the destination endpoint. The outer GRE packet 624 comprises an outer GRE header 800a and a payload containing inner encapsulated packet 622. The inner encapsulated packet 622 comprises an inner delivery header 900b and an inner GRE header 800b. The inner delivery header 900b is used to deliver the encapsulated packet 622, preferably through the tunnel, to the source endpoint and comprises IP header information 902b, IP source address 904b and IP destination address 906b related to delivery protocol used to deliver the inner encapsulated packet 622 to the source endpoint. In the illustrative embodiment described herein, the inner encapsulated packet 622 is a return-keepalive packet that is returned to the source endpoint from the destination endpoint.

Figure 7A:
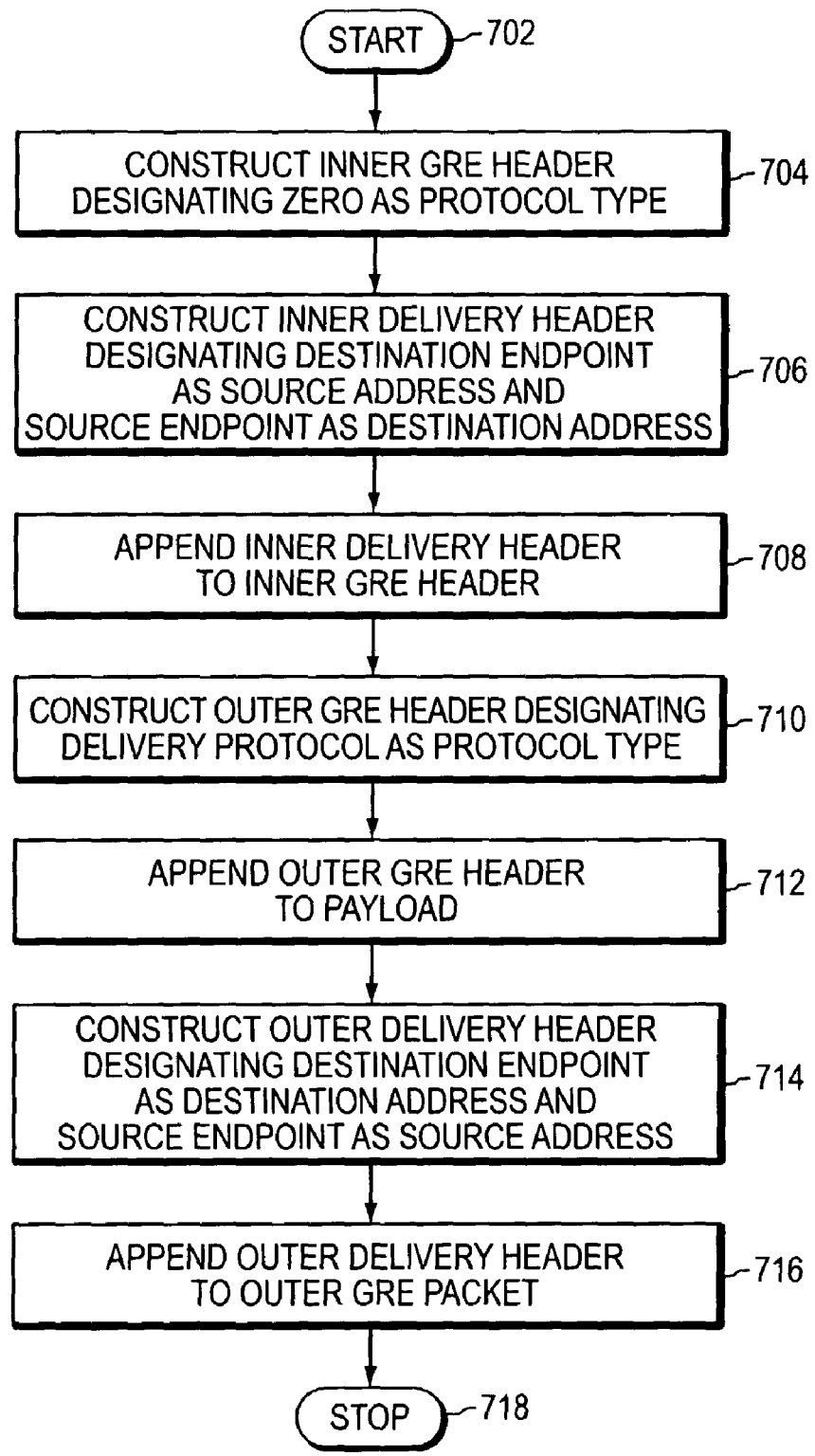
FIGS. 7A-B are an illustration of a technique that can be used to implement the present invention at a source endpoint.
Figure 8:
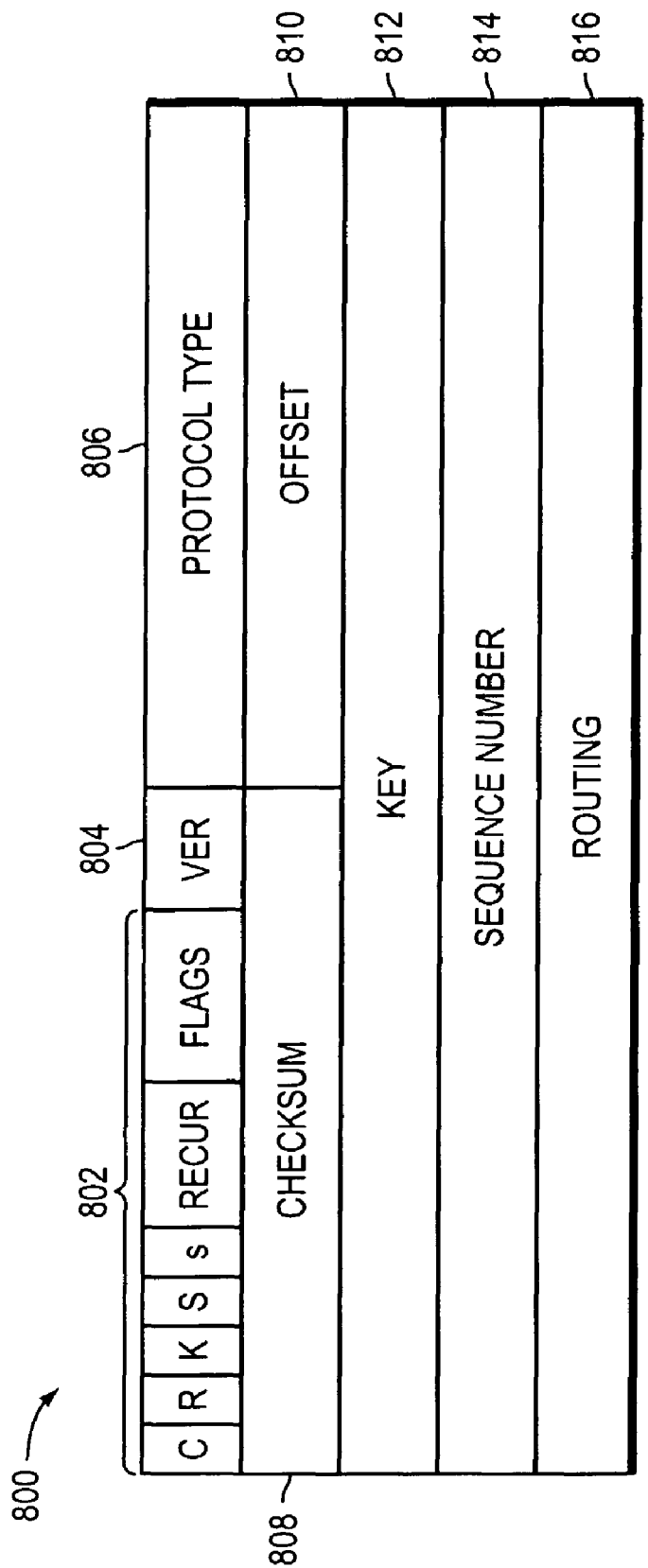
FIG. 8 is an illustration of a GRE header that can be used with the present invention.

FIG. 7A is a flow diagram of a sequence of steps that can be used to construct keepalive packet 600, as described herein. The sequence starts at Step 702 and proceeds to Step 704 where inner GRE header 800b is constructed. FIG. 8 is an illustration of a typical GRE header 800, in accordance with RFC 1701, comprising a flags field 802, a version field 804, a protocol type field 806 and optional checksum 808, offset 810, key 812, sequence number 814 and routing 816 fields. The flags field 802 is used to primarily indicate which of the optional fields are present; moreover this field 802 specifies strict source routing and recursion control. The version field 804 specifies the GRE version number and is typically set to zero. The protocol type field 806 specifies the protocol type of the payload packet. The checksum field 808 specifies the checksum of the GRE header and the payload packet. The offset field 810 indicates the octet offset from the start of the routing field 816 to the first octet of the active source route entry. The key field 812 specifies a four-octet number that is inserted by the encapsulator to accommodate authentication of the packet. The sequence number field 814 specifies a sequence number inserted by the encapsulator and the routing field 816 comprises a list of source to route entries.

At Step 704 (FIG. 7A), router 200a constructs the GRE header 800b by loading the fields of the header with the appropriate values. In particular, router 200a loads the flags 802, version 804, checksum 808, offset 810, key 812, sequence number 814 and routing fields 816 in a conventional manner. Preferably, the flags field 802 is set to indicate that the sequence number 814, offset 810 and routing fields 816 are not used. Moreover, router 200a loads a value of zero in the protocol type field 806 to indicate that the packet 622 is a return-keepalive packet.

Figure 9:
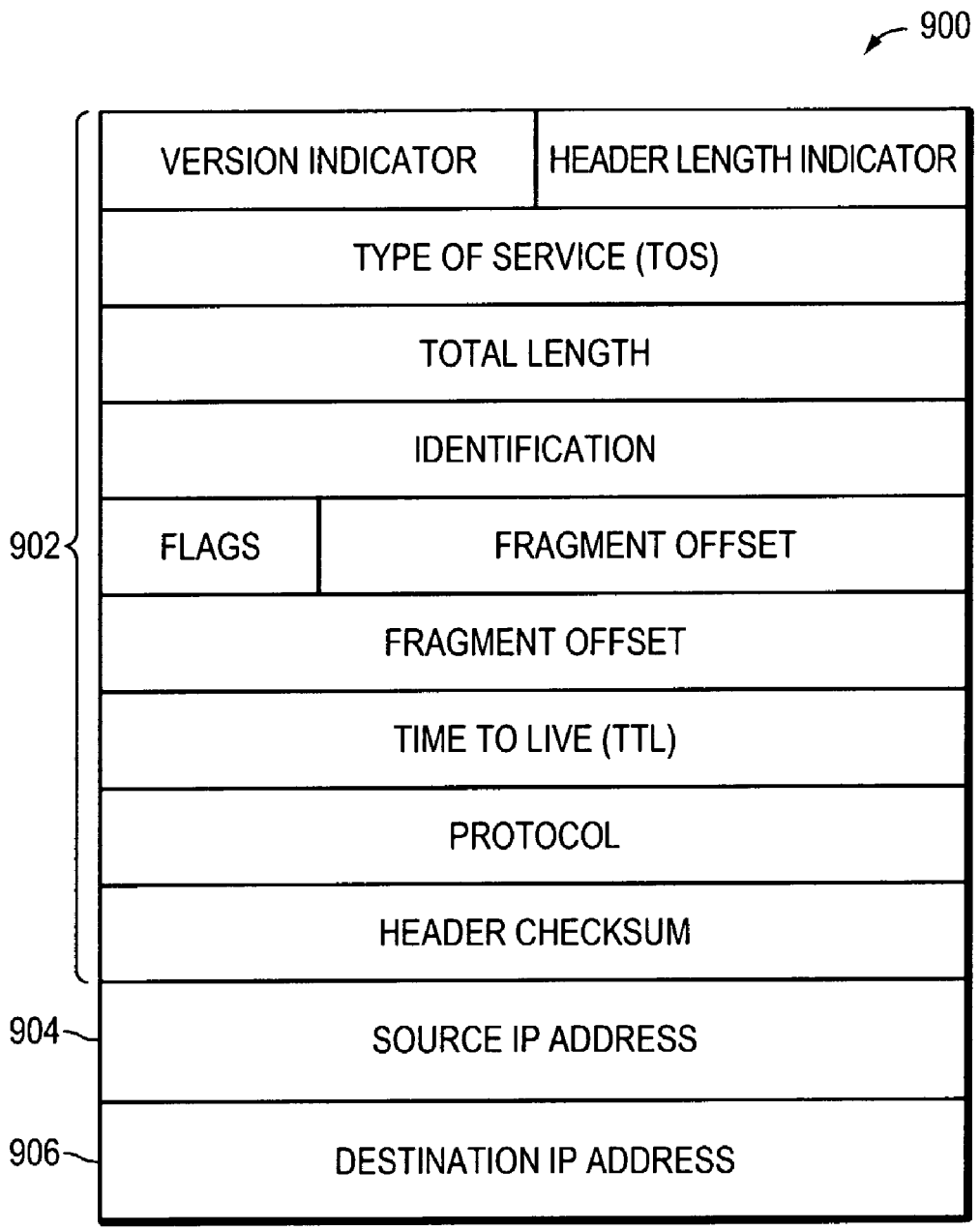
FIG. 9 is an illustration of an IP header that can be used with the present invention.

Next at Step 706, router 200a constructs inner delivery header 900b, which, in the illustrative embodiment, is a conventional IP header. FIG. 9 illustrates a conventional IP header in accordance with RFC 791, available from the Internet Engineering Task Force, Network Working Group, http://www.ietf.org and is incorporated by reference as though fully set forth herein. IP header 900 includes various header information fields 902, a source IP address field 904 and a destination IP address field 906. The header information fields 902 include various packet and IP protocol specific information fields. The source IP address 904 specifies the IP address of the node that is sending the packet and the destination IP address 906 specifies the IP address of the node that is to receive the packet.

Specifically at Step 706, router 200*a* creates and loads header 900*b* in a conventional manner, including loading the IP address associated with the destination endpoint 200*b* in the IP source field 904*b* and the IP address associated with the source endpoint 200*a* in the IP destination field 906*b*. Router 200*a* then appends the inner delivery header 900*b* to the inner GRE header 800*b*, as indicated at Step 708.

Next, router 200*a* constructs outer GRE header 800*a*, as indicated at Step 710. Specifically, router 200*a* loads the fields associated with GRE header 800*a* in a conventional fashion. Moreover, router 200*a* specifies the delivery protocol (i.e., the IP protocol) in the protocol type field 806. The outer GRE header 800*a* is then appended to the payload 622 to form the GRE packet 624, as indicated at Step 712.

At step 714, router 200*a* constructs outer delivery header 900*a*, which, in the illustrative embodiment, is also a conventional IP header. Specifically, router 200*a* creates and loads header 900*a* in a conventional manner, including specifying the IP address associated with the source endpoint in the IP source field 904*a* and the IP address associated with the destination endpoint in the IP destination field 906*a*. Next at Step 716, the outer deliver header 900*a* is appended to the GRE packet 624 to form packet 600. The sequence ends at Step 718.

Figure 7B:
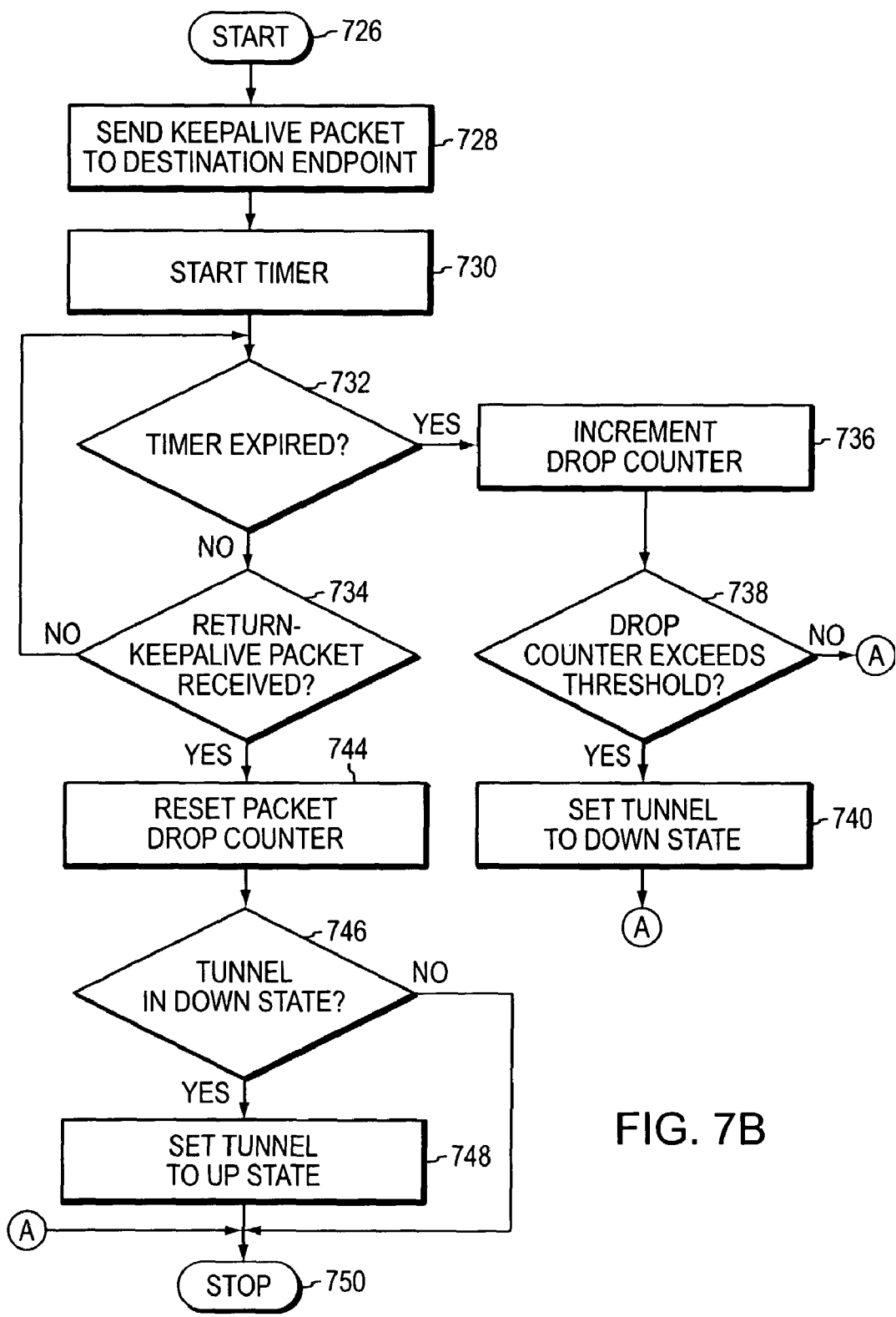

Referring again to FIG. 5, router 200*a* then sends packet 600 over tunnel 150 towards the destination endpoint 200*b*, starts a timer associated with packet 600 and waits for either the timer to expire or the return-keepalive packet 622 has been received on tunnel 150, as indicated at Step 508. FIG. 7B illustrates a sequence of steps that can be used by router 200*a* to perform Step 508. The sequence begins at Step 726 and proceeds to Step 728 where router 200*a* sends packet 600 over the tunnel towards the destination endpoint 200*b*. Next at Step 730, router 200*a* starts a timer associated with packet 600. At Step 732, router 200*a* then determines if the timer has expired. Preferably, the timer is considered expired if the elapsed time represented in the timer exceeds the expected round-trip time associated with the packet 600, i.e., the expected time it takes for the packet to travel to the destination endpoint, be processed at the destination endpoint and return to the source endpoint. If the timer has not expired, router 200*a* follows the NO arrow and proceeds to Step 734 where it determines if the return-keepalive packet 622 has been received. If the return-keepalive packet has not arrived, router 200*a* follows the NO arrow and returns to Step 732. Steps 732-734 are repeated until either the return-keepalive packet 622 has been received or the timer has expired.

Referring once again to FIG. 5, at Step 510 the destination endpoint 200*b* receives and decapsulates keepalive packet 600. The resultant decapsulated packet is the return-keepalive packet 622. The destination endpoint 200*b* then forwards the return-keepalive packet 622 preferably over the tunnel towards the source endpoint 200*a*, as indicated at Step 512. At Step 514, the source endpoint 200*a* receives the return-keepalive packet 622 and processes it as indicated at Step 516. The sequence then ends at Step 518.

Referring again to FIG. 7B, Steps 734-750 can be used to process return-keepalive packet 622, as described herein. At Step 734, source endpoint router 200*a* follows the YES arrow and proceeds to Step 744 where a packet drop counter 345 (FIG. 3) is reset to to indicate no return-keepalive packets have been dropped. The packet drop counter 345 is preferably kept in the processor memory 340 and keeps tracks of the number of return-keepalive packets that have failed to arrive within the expected round-trip time. At Step 746, router 200*a* determines if tunnel 150 is in a "down" state, i.e., tunnel line protocol is non-operational. If it is not, router 200*a* follows the NO arrow and proceeds to Step 750 where the sequence ends. Otherwise, router 200*a* follows the YES arrow and proceeds to Step 748 where it places tunnel 150 in an "up" state. Preferably, placing tunnel 150 in the up state indicates that the line protocol of tunnel 150 is operational, thus enabling tunnel 150 to forward and process all traffic, including keepalive packets 600. Router 200*a* then proceeds to Step 750 where the sequence ends.

Now assume that destination endpoint 200*b* is not reachable. The timer eventually expires because return-keepalive packets 622 are not being returned to the source endpoint 200*a*. Thus, router 200*b* at Step 732 follows the YES arrow to Step 736 where router 200*a* increments the packet drop counter. At Step 738, router 200*a* determines if the packet drop counter exceeds a predetermined threshold. Preferably, this threshold is a predetermined number that represents the number of return-keepalive packets that can be dropped before the source endpoint concludes the destination endpoint is not reachable. If the drop counter does not exceed the threshold, router 200*a* follows the NO arrow and proceeds to Step 750 where the sequence ends. Otherwise, router 200*a* assumes that the destination endpoint is unreachable and proceeds to Step 740 where it sets tunnel 150 in a down state by, preferably bringing down the line protocol associated with tunnel 150. In the line protocol down state, tunnel 150 preferably continues passing keepalive packets 600 and return-keepalive packets 622 in the manner described above, however, all other packets are discarded. Router 200*a* then proceeds to Step 750 where the sequence ends.

In the illustrated embodiment of the invention, after a keepalive packet is sent, preferably another keepalive packet is not sent until either the timer expires or the return-keepalive packet associated with the sent keepalive packet is received. However, this is not a requirement of the invention. Rather in other embodiments of the invention, the keepalive packets are constructed and sent at regular intervals regardless of whether or not the above conditions are met. For example in one embodiment, keepalive packets are sent at regular intervals and a counter is kept to track the number of return-keepalive messages that are outstanding, i.e., the number of return-keepalive messages that have not been received at the source endpoint. When the counter reaches a predetermined threshold, the source endpoint concludes the destination endpoint is unreachable and responds accordingly.

Also, in the above-described embodiment of the invention, certain aspects of the invention is described as operating in accordance with GRE as described in RFC 1701, however, this is not a limitation of the invention. For example, in other embodiments of the invention, other versions of GRE, such as described in RFC 2784 and RFC 2890, are used.

It should be further noted that in the above-described embodiments of the invention the encapsulation protocol is the GRE protocol, however, this is also not a requirement of the invention. Rather, other encapsulation protocols can be used. For example, in another embodiment of the invention the "IP Encapsulation within IP" protocol described in RFC 2003 and available from the Internet Engineering Task Force, Network Working Group, http://www.ietf.org, is used as the encapsulation protocol. In this embodiment, the options field or the length field of the inner IP header may be used to identify the return-keepalive packet as a keepalive packet.

It should further be noted that in the above-described embodiment of the invention the delivery protocol is version 4 of the IP protocol (IPv4), however, this is also not a requirement of the invention. Rather, in other embodiments of the invention the keepalive and return-keepalive packets are delivered using other protocols capable of delivering keepalive packets such as, e.g., version 6 of the IP protocol (IPv6) described in RFC 2460 and available from the Internet Engineering Task Force, Network Working Group, http://www.ietf.org.

It should be further noted that it is not a requirement of the invention that the destination endpoint run the inventive protocol as described herein. In one embodiment of the invention, the destination endpoint does not run the inventive protocol as described herein and simply processes and forwards the return-keepalive packets in a conventional manner as other packets received over the tunnel by the destination endpoint.

Finally, it should be noted that in the above-described embodiment of the invention, the return-keepalive packet is returned to the source endpoint by sending the packet over the tunnel on which it was received at the destination endpoint, however, this is not a limitation of the invention. Rather, in other embodiments of the invention, the return-keepalive packet is simply routed (forwarded) back to the source endpoint outside the tunnel.

In summary, the present invention incorporates a technique for enabling a source endpoint to determine if a destination endpoint of a tunnel through a computer network is reachable. It will be apparent, however, that other variations and modifications may be made to the described embodiments, with the attainment of some or all of their advantages. Therefore, it is an object of the appended claims to cover all such variations and modifications as come within the true spirit and scope of the invention.

What is claimed is:

1. A method comprising:
constructing an outer encapsulated packet containing an inner encapsulated packet, the outer encapsulated packet including an outer delivery header that is used to deliver the outer encapsulated packet to a destination endpoint and an outer Generic Routing Encapsulation (GRE) header, and the inner encapsulated packet including an inner delivery header that is used to deliver the packet to a source endpoint and an inner GRE header;
sending the outer encapsulated packet towards a destination endpoint;
incrementing a counter to track a number of outstanding inner encapsulated packets, the number of outstanding inner encapsulating packets being a number of inner encapsulated packets that have been sent to but not received back from the destination endpoint;
concluding the destination endpoint is unreachable if the number of outstanding inner encapsulated packets exceeds a predetermined threshold; and
in response to the destination endpoint being concluded to be unreachable, setting a tunnel to a down state to prevent data packets from being forwarded by the tunnel.

2. The method of claim 1 wherein the inner delivery header contains a source address field and a destination address field and wherein the constructing an outer encapsulated packet containing an inner encapsulated packet further comprises:
loading an address associated with the destination endpoint in the source address field; and
loading an address associated with the source endpoint in the destination address field.

3. The method of claim 1 wherein the outer delivery header contains a source address field and a destination address field and wherein the constructing an outer encapsulated packet further comprises:
loading an address associated with the source endpoint in the source address field; and
loading an address associated with the destination endpoint in the destination address field.

4. The method of claim 1 wherein the constructing an outer encapsulated packet further comprises:
constructing the inner GRE header, the inner GRE header containing a protocol type field;
loading the protocol type field to indicate the packet is a return-keepalive packet;
constructing the inner delivery header;
appending the inner delivery header to the GRE header to form a payload;
constructing the outer delivery header; and
appending the outer delivery header to the payload.

5. The method of claim 1 further comprising:
in response to the destination endpoint concluded to be unreachable, setting the tunnel to a down state and discarding a plurality of packets directed to the tunnel.

6. The method of claim 1 wherein the inner delivery header includes a source address field having an address of the destination endpoint and a destination address field having an address of the source endpoint.

7. The method of claim 1 further comprising:
determining a period of time that has elapsed since the outer encapsulated packet was sent.

8. The method of claim 1 further comprising:
in response to receipt of an outstanding inner encapsulated packet, determining if the tunnel is in a down state and, if so, set the tunnel to an up state.

9. The method of claim 1 wherein setting the tunnel to a down state comprises bringing down a line protocol associated with the tunnel so that the line protocol is non-operational.

10. An apparatus comprising:
a processor configured to encapsulate an inner encapsulated packet in an outer encapsulated packet, the outer encapsulated packet including an outer delivery header that is used to deliver the outer encapsulated packet to the destination endpoint and an outer Generic Routing Encapsulation (GRE) header, and the inner encapsulated packet including an inner delivery header that is used to deliver the packet to the source endpoint and an inner GRE header;
a line card configured to send the outer encapsulated packet on a tunnel to the destination endpoint, and to await return of the inner encapsulated packet;
a counter configured to increment a number of outstanding inner encapsulated packets, the number of outstanding inner encapsulating packets being a number of inner encapsulated packets that have been sent to but not received back from the destination endpoint; and
wherein the processor is further configured to determine that the destination endpoint is unreachable if the number of outstanding inner encapsulated packets exceeds a predetermined threshold, and in response to the destination endpoint determined to be unreachable, set the tunnel to a down state to prevent data packets from being forwarded by the tunnel.

11. The apparatus of claim 10 wherein the inner delivery header includes a source address field having an address of the destination endpoint and a destination address field having an address of the source endpoint.

12. The apparatus of claim 10 further comprising:
a timer configured to determine a period of time that has elapsed since the outer encapsulated packet was sent.

13. The apparatus of claim 10 wherein the processor is further configured to, in response to receipt of an outstanding inner encapsulated packet, determine if the tunnel is in a down state and, if so, set the tunnel to an up state.

14. Software embodied in one or more non-transitory computer-readable media and when executed operable to:
encapsulate an inner encapsulated packet in an outer encapsulated packet, the outer encapsulated packet including an outer delivery header that is used to deliver the outer encapsulated packet to the destination endpoint and an outer Generic Routing Encapsulation (GRE) header, and the inner encapsulated packet including an inner delivery header that is used to deliver the packet to the source endpoint and an inner GRE header;
send the outer encapsulated packet on a tunnel to the destination endpoint, and to await return of the inner encapsulated packet;
increment a number of outstanding inner encapsulated packets, the number of outstanding inner encapsulating packets being a number of inner encapsulated packets that have been sent to but not received back from the destination endpoint;
determine that the destination endpoint is unreachable if the number of outstanding inner encapsulated packets exceeds a predetermined threshold; and
in response to the destination endpoint being determined to be unreachable, set the tunnel to a down state to prevent data packets from being forwarded by the tunnel.

* * * * *

UNITED STATES PATENT AND TRADEMARK OFFICE
CERTIFICATE OF CORRECTION

| | |
|---|---|
| PATENT NO. | : 7,801,021 B1 |
| APPLICATION NO. | : 10/187202 |
| DATED | : September 21, 2010 |
| INVENTOR(S) | : Nikolaos Triantafillis |

It is certified that error appears in the above-identified patent and that said Letters Patent is hereby corrected as shown below:

Col. 3, Line 4, please amend as shown:

Protocol (ICMP) messages or the Packet[[ to]] INternet Groper

Col. 3, Line 61, please amend as shown:

rated, San Jose,[[ Califormia]] California. The illustrative intermediate

Col. 6, Line 54, please amend as shown:

field 816 comprises a list of source[[ to]] route entries.

Col. 8, Line 5, please amend as shown:

(FIG. 3) is reset to[[ to]] indicate no return-keepalive packets

Signed and Sealed this

Twenty-third Day of November, 2010

David J. Kappos
*Director of the United States Patent and Trademark Office*